United States Patent
Branigan et al.

Patent Number: 5,282,589
Date of Patent: Feb. 1, 1994

[54] TERRAIN CUEING

[75] Inventors: Robert G. Branigan, Springfield; William M. Decker, Roanoke; J. Brian Gillespie, Woodbridge, all of Va.; Jack L. Kimberly, Shippensburg, Pa.; Robert S. Rohde, Alexandria, Va.; Richard H. Vollmerhausen, Arlington, Va.; Edwin W. Wentworth, Woodbridge, Va.

[73] Assignee: The United States of America as represented by the Secretary of the Army, Washington, D.C.

[21] Appl. No.: 872,376

[22] Filed: Apr. 23, 1992

[51] Int. Cl.⁵ .......... B64F 1/20; B64D 47/02; G01S 13/04; G08G 5/04
[52] U.S. Cl. .......... 244/114 R; 244/1 R; 362/62; 342/63; 342/65; 250/495.1; 340/954; 340/981
[58] Field of Search .......... 214/1 R, 114 R; 362/62; 340/947, 948, 950, 953, 954, 980, 981; 342/63, 64, 65; 250/495.1, 493.1, 494.1

[56] References Cited

U.S. PATENT DOCUMENTS

| | | | |
|---|---|---|---|
| 1,648,463 | 11/1927 | Rohrbach | 340/981 |
| 1,845,153 | 2/1932 | Hyatt | 362/62 |
| 2,017,692 | 10/1935 | Gaty | 244/114 R |
| 3,102,993 | 9/1963 | Jensen | 340/981 |
| 3,569,690 | 3/1971 | Nelson | 362/62 |
| 4,115,841 | 9/1978 | Alexander | 362/62 |
| 4,158,885 | 6/1979 | Neuberger | 340/981 |
| 4,299,483 | 11/1981 | Grove et al. | 340/947 |
| 4,912,334 | 3/1990 | Anderson | 362/62 |
| 4,916,445 | 4/1990 | Crossley | 362/62 |

Primary Examiner—Michael S. Huppert
Assistant Examiner—Virna Lissi Ansley
Attorney, Agent, or Firm—Milton W. Lee; John E. Holford; Anthony T. Lane

[57] ABSTRACT

The invention provides an array of standard infrared aiming lights mounted on an aircraft and used occasionally by pilots wearing infrared goggles to enhance perception of terrain features on low flying missions.

15 Claims, 3 Drawing Sheets

TERRAIN CUEING

BACKGROUND OF INVENTION

1. Field

The invention relates to infrared night vision systems for aircraft, particularly systems for helicopters.

2. Prior Art

Night operations with low flying covert aircraft like helicopters is possible with an Army developed night goggle system Aviators Night Vision Imaging System (ANVIS). The goggles amplify any visible light present due to the moon or stars and covert ambient infrared light to visible light. The longer wavelengths of infrared are particularly useful in fog and haze and in locating ground features by their temperature differentials. In certain cases visibility can be enhanced using infrared illuminators, since these are not visible to the naked eye. Usually an aviator wearing the above goggles can see obstacles well enough to avoid them, however, exceptions do occur. Featureless, low contrast terrain, such as desert sand dunes, can be such an exception. Under certain conditions of weather and natural illumination rising terrain features are indistinguishable causing a pilot to inadvertently fly into the terrain. While the use of active infrared devices is normally avoided on military helicopters, limited use to avoid loss of an airship is considered warranted in this circumstance. An object of the present invention is, therefore, to provide a narrow beam, minimum radiation, active, infrared (IR) obstacle avoidance device for use on terrains of the type indicated above.

SUMMARY OF THE INVENTION

The present invention is an improvement for the Aviator's Night Vision Imaging System (ANVIS) which is designed to provide helicopter pilots with visibility of terrain and targets at night. To enhance terrain perception capabilities a plurality of cueing lights are fastened to the aircraft and directed toward the approaching terrain. These lights provide pairs of illumination cue spots which enhance the visual perception of the terrain and aid in avoiding obstacles.

The primary object of this invention is to prevent aircraft accidents by use of cueing lights.

BRIEF DESCRIPTION OF THE DRAWINGS

The invention is best understood with reference to the accompanying drawings wherein.

DESCRIPTION OF THE PREFERRED EMBODIMENTS

Figure 1:
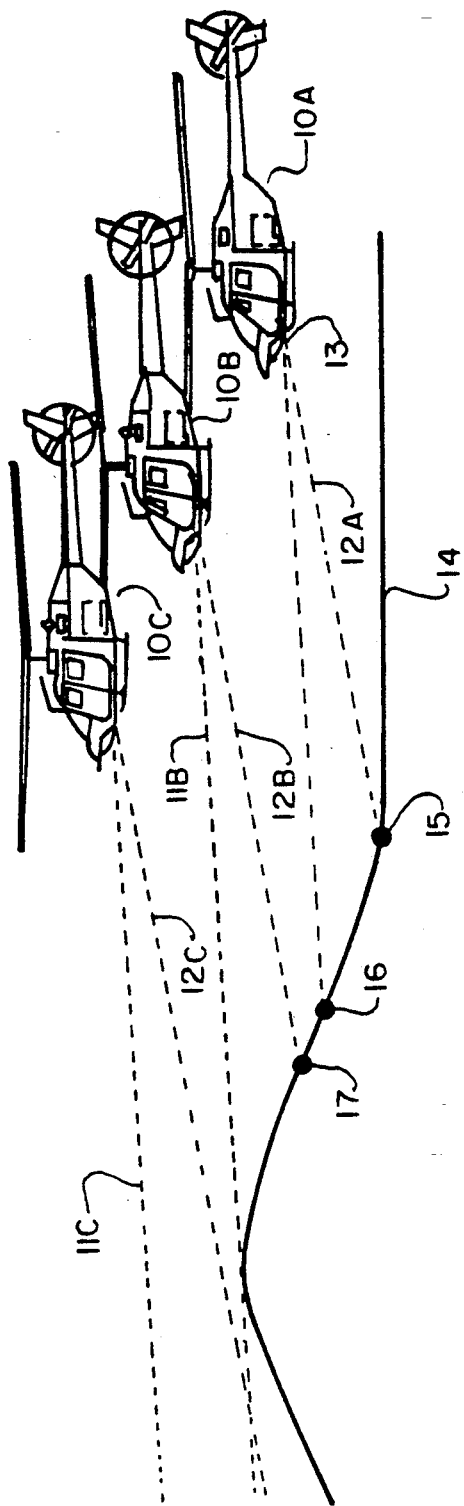
FIG. 1 shows a helicopter located at three different levels over a rising terrain and equipped with aiming lights of the present invention.

As shown in FIG. 1, when following ground terrain in a desert, a pilot may basically fly at three levels, as indicated by the three helicopters 10A, 10B and 10C. At the level of airship 10A the craft is hidden by the rise or sand dune from any enemy ground force that lies ahead. There are, however, very few visual cues in this type of terrain to warn the pilot that he is basically flying into the ground. It is not unusual for the pilot to overlook a near dune when viewed against a more distant and higher one. Always flying at a level equal to the highest possible obstruction as indicated by airship 10B may provide some protection from early detection, but is much more risky then true terrain following. Flying at a totally clear altitude as with airship 10C is the only safe mode, if no accurate data is available. Radar altimeters may not be accurate at low altitudes due to slant angles as encountered here. This is particularly true of sand soil which permits high penetration scattering and absorption. There are also the problems of enemy radar detectors and means for presenting the data to the pilot wearing IR goggles.

The applicants have solved this problem by adding a plurality of infrared aiming lights to the underside of the airship or helicopter. The Army has developed aiming lights for use with long range rifles and similar weapons. The lights have very narrow infra-red beams, invisible to the unaided eye, which are normally boresighted with the rifle or directed to intersect the trajectory of the rifle bullet at distant target ranges. A marksman with goggles needs only to fix the spot illuminated by the beam on the target to ensure a hit. The Army's AN/PAQ-4A Aiming Light can easily provide a range of 300 to 800 meters which is adequate for the present application.

A secondary aiming light on the airship substantially at point 13 has its beam 12A, 12B or 12C directed downward from the horizontal flight path by an angle of less than ten degrees. The pilot observes the spot 15 or 17, etc, produced by this beam as it moves over the terrain. A primary aiming light closely spaced from said secondary light, so that it is also substantially at the same point 13 is directed with its beam 11A, 11B, 11C, etc., coincident with or very much closer to the flight path and its spot 16 is also observed on the same terrain during low level flight and most importantly during descending flight.

The term "flight path", as used herein, refers to a fixed axis through the center of the aircraft which coincides with the motion vector of that aircraft when it maintains a straight level course. By directing both beams nearly parallel to a vertical plane through the flight path, for straight and level flight, both spots remain near the center of the pilot's field of vision. Their presence, relative motion and relative intensity provide excellent cues to terrain obstacles that are encountered.

Note, for example, that the spots 15 and 17 become much closer spaced on the rising terrain than they would have been, if the terrain had remained flat. The pilot would respond to this cue by increasing his altitude as from position 10A and 10B. Spot 15 moves to spot 17 and spot 16 diminishes in intensity or totally disappears. As the airship continues to rise to position 10C spot 17 or 15 also diminishes in intensity or disappears. This is the final cue that the obstacle has been cleared and the airship can safely begin to assume a descending altitude until the spots reappear or increase to their former intensity. The intensity and spacing of the spots when the reappear will immediately signify the nature of the new terrain. When the local conditions that create the poor visibility, abate; the aiming lights are shut off to avoid the possibility of detection by ground forces equipped with night vision devices.

Figure 2:
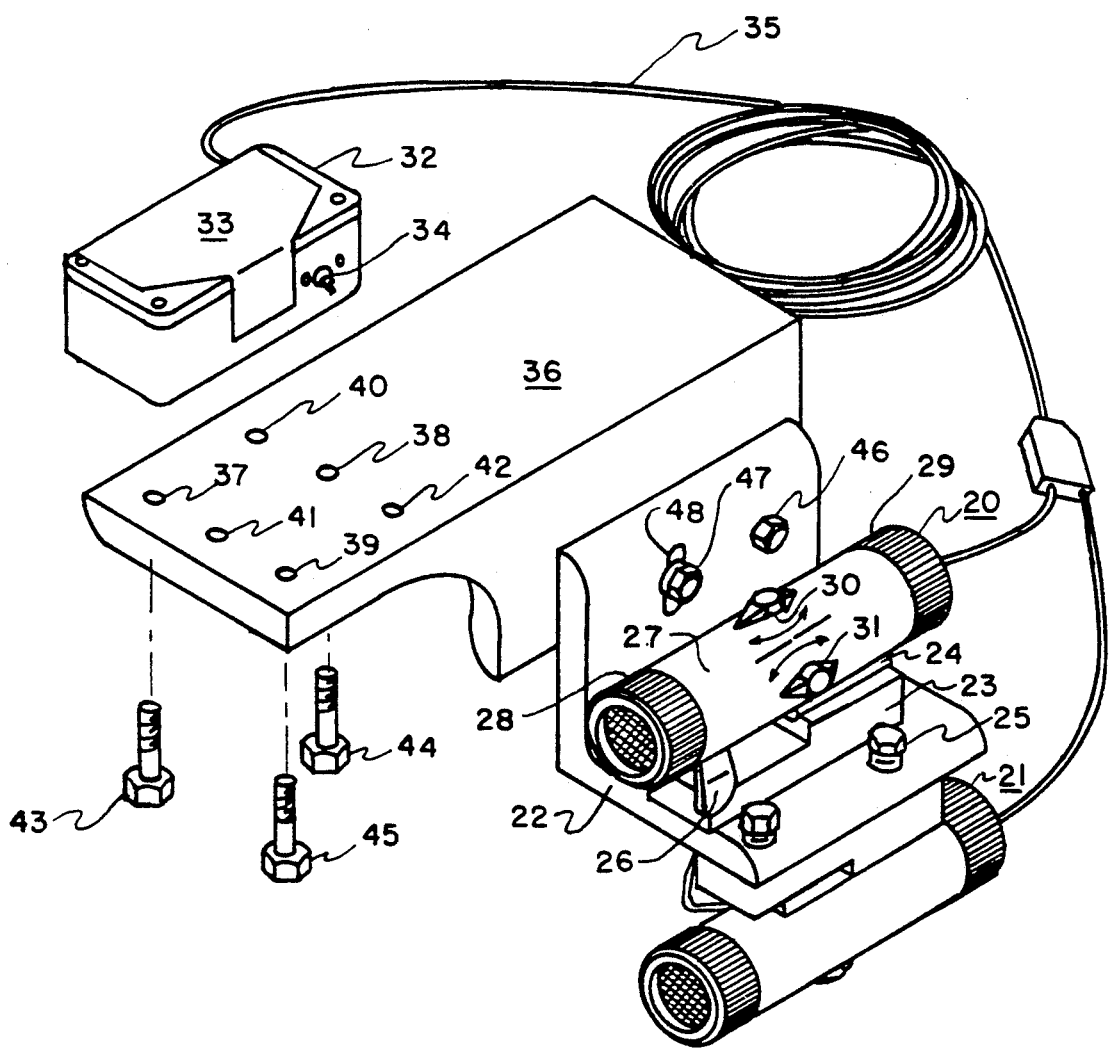
FIG. 2 is a detailed showing of an aiming light kit specifically designed for use on the Army's OH-58 Scout helicopter.

FIG. 2 shows an aiming light kit designed for use on the Army's OH-58 Scout aircraft. The kit includes two aiming lights 20 and 21 mounted on opposite sides of a horizontal leg on an angle bar support bracket 22. Each aiming light is first attached to a stepped height vee block 23 by allen-head screws (not shown) which project through the thick grooved rear half of the block into the mounting rail 24 which is integral with the housing 25 enclosing the aiming light. The mounting rail normally would engage a mating slot on a rifle or other weapon. The heads of the allen-head screws are recessed into the lower surface of the vee block that abuts the support bracket 22. Hex head bolts inserted through holes in the support bracket engage threaded holes in the vee block to complete the mounting. The thinner front half of the vee block has a height and width designed to interfere with a switch toggle 26 of the aiming light, locking it in its "on" position. This width is carried through both the front and back halves of the vee block.

The aiming light is sealed in a tubular housing 27 closed at its front end by threaded aperture cap 28 that provides access to any lenses, filters or protective screens required. The rear end is sealed by a similar cap 29 which is normally not an aperture but which provides access to a battery in that end of the housing. Adjustment knobs 30 and 31 engage shafts that extend into the housing to slightly vary the azimuth and elevation attitudes of the aiming light source, normally to achieve a boresighted condition with a rifle.

In the above embodiment of the invention the toggle switch is replaced by a remote switching unit 32 serially connected to the aiming light source, which may be a light emitting diode (LED) or other infrared source. The unit has a hinged cover 33 that provides access to the four AA batteries connected and arranged in the unit to provide the required voltage and current for the source. A switch 34 projecting through a side wall of the unit controls the current to the sources. The modified cap 29 on each aiming light is apertured to receive an output end of a harness wire 35 from the switching unit. The output ends of the harness wire terminate in blocks of plastic (not shown) which have the same size, shape and function as the batteries normally in the aiming light. Each plastic block carries two metal terminals to match the battery terminals and the two conductors in wire 35 are soldered or otherwise electrically connected to these different terminals in the proper polarity, this is a well understood practice.

Figure 3:
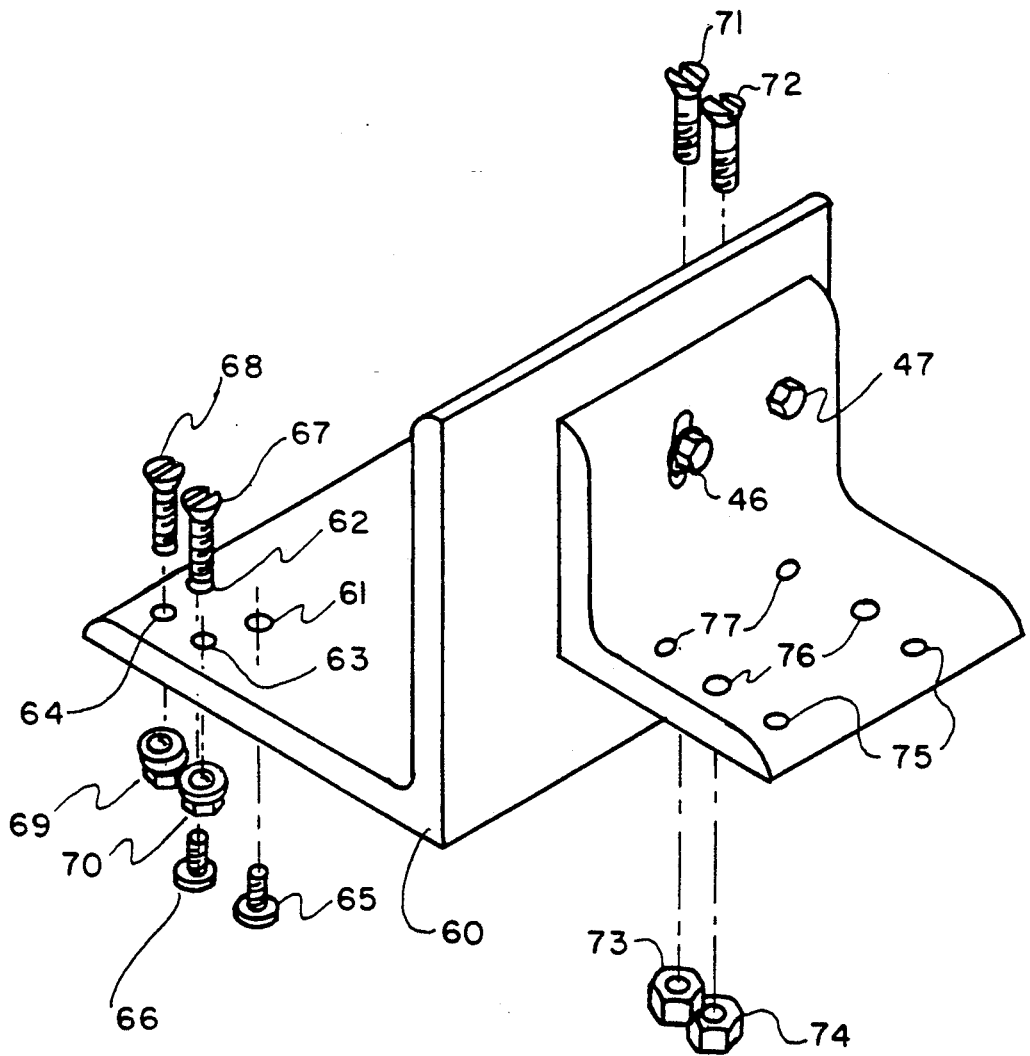
FIG. 3 shows an angle bracket adapter attached to the aiming light mounting bracket in FIG. 2, designed for use on the Army's UH-60 Blackhawk helicopter.

To mount the aiming lights on a specific aircraft, an aircraft adapter bracket is required The bracket 36 shown fits the OH-58 Scout aircraft. It has three holes 37, 38 and 39 which match the holes in the Left Forward Jacking and Tie Down Fitting on the aircraft. The bolts that hold this fitting on are removed and replaced with longer 3 inch bolts 43, 44 and 45 which are passed first through the fitting, then through a bracket and finally into threaded holes in the frame of the aircraft. The similar set of holes 40, 41 and 42 permit the bracket to be reversed and used, for example, with the Right Forward Jacking and Tie Down Fitting, if the Left Fitting is in use or damaged. Aircraft mounting is completed by connecting the vertical leg of the adapter bracket to the light mounting bracket. This is accomplished using two hex bolts 46 and 47. Bolt 46 is mounted through a round hole near the vertical center of the leg and close to the right side of leg. Bolt 47 is mounted through the center of a slot 48 centered near the vertical center of the leg, but near the left edge of the leg. Both bolts are received by threaded holes (not shown here) in the vertical leg of the adapter bracket. Bolt 46 is not fully tightened until the upper aiming light is leveled and bolt 47 fully tightened. The switching unit or control box 32 is placed in the cockpit near a crew member and the wire 35 is fed through the aircraft door. The wire may then be attached to intermediate struts and surfaces using wire ties, tape and other protective devices as required FIG. 3 shows a kit for mounting the present invention on the Army's UH-60 Blackhawk Helicopter. The helicopter has an entry step about even with the bottom of the airframe, on the top of which the aiming lights can be conveniently mounted. (The lights cannot be safely mounted under the airframe as was done on the Scout because of its close proximity to the ground.) The same light mounting bracket 22 used on the Scout is used in this kit. The adapter bracket 60, however, is larger and has four mounting holes, e.g., holes 61-64, in the two corners of the horizontal leg remote from the vertical leg. These holes correspond exactly to eight holes found in the entry step. The holes are normally used to mount a metal footpad covered with an antislip material. The footpad has four threaded holes to receive machine screws 65 and 66 inserted from the bottom of the step and threaded into holes 61 and 62 on the horizontal leg of bracket 60 as a means of temporarily positioning this member on the step. Slotted bolts 67, 68, 71 and 72 with recessed heads are inserted through the three members and secured with nuts 69, 70, 71 and 72. These nuts may be self locking or be used with lockwashers. The wide horizontal leg of adapter 60 spaces its vertical leg from the footpad, so that the latter member can be used effectively by the crew. The wide vertical leg insures that the aiming lights will not be kicked and damaged. The holes (not shown) in the vertical leg of adapter 60 that receive bolts 46 and 47 are located above and to the right of the center of the vertical leg so as to place both aiming lights behind the vertical leg as viewed from the footpad for optimum protection. When so mounted the lights are sandwiched between the adapter's vertical leg and the vertical surface of the helicopter body. It is preferred that the kits be made from aircraft materials, such as aluminum alloys, but steel and other metals may obviously be used.

The above designs provide elevation cues, so that the pilot can avoid obstacles by going over them. Sometimes it is safer to go around an obstacle rather than over it. A partial solution to this problem might be to direct the beams of the aiming lights parallel to a plane through the flight path at 45° with the vertical and horizontal thus providing both elevation and azimuth cues of less amplitude. If the situation is such that only going around obstacles can be tolerated, then the beams of both aiming lights should be directed parallel to a horizontal plane through the flight path to obtain the maximum azimuth cue. In the preceding examples the angles between the legs of the adapter bracket were 90°, but there was room in both cases to increase that angle to 135° or 180°, the latter of course becoming a flat plate bracket.

Another possible application of this system would be to have pairs of aiming lights with pairs of beams directed parallel to both the horizontal and vertical planes through the flight path. This, of course, can be done with three aiming lights. The present bracket 22 is large enough to accommodate a third vee block on the underside next to light 21. This would require only drilling two additional holes 77 in bracket 22 as shown in FIG.

3. These holes would be located between holes 76, used for the existing upper aiming light 20, and the vertical leg of bracket 22. These additional holes should be symmetrical with holes 75, used for the existing lower aiming light 21, allowing sufficient clearance for the vee blocks and the hex heads of their mounting screws. Another solution changing the current hardware is to mount a kit on each side of the aircraft. In the above examples identical mounting interfaces are present on both sides of the aircraft and the orientation of the adapter brackets and the vee blocks can obviously be rotated 180°. One aiming light can be omitted on one side of the aircraft for a three light system. There is, however, a logic in using all four aiming light in such an arrangement. The vertical angle of view is only about half the horizontal angle of view. The pilot dodging obstacles horizontally must decide whether to turn right or left, whereas dodging vertically the only safe way is up. The added information provided by a four light system may be a very comfortable advantage. Five and six light systems also fit the hardware described and can obviously be switched on and off as pairs or larger groups to provide the azimuth or elevation cues desired.

Industrial applicability of the present invention includes but is not limited to: military, commercial aviation, law inforcement, and aerial surveillance.

We claim:

1. In combination with a low flying, terrain following aircraft piloted by a humanoid equipped with electronic infrared viewing equipment, the improvement comprising:
   at least a pair of closely spaced infrared laser type aiming lights emitting extremely narrow beams of radiation attached to substantially the same point on the outer surface of said aircraft, a first of said aiming lights arranged with its beam substantially parallel to the flight path of said aircraft and the beam from said second light being separated by an angle of less than ten degrees with the beam of said first light, whereby said beams diverge to illuminate two close but noticeably separated cue spots on said terrain at any altitude.

2. The combination according to claim 1 wherein:
   the beams from both of said lights are directed parallel to a vertical plane through said flight path when said aircraft is in level flight.

3. The combination according to claim 2 wherein:
   said beam substantially parallel to said flight path is the highest beam.

4. The combination according to claim 1 wherein:
   said lights are mounted such that the angles between their beams can be adjusted between eight degrees and less than one degree.

5. The combination according to claim 2 wherein:
   said lights are mounted such that the angles between their beams can be adjusted between eight degrees and less than one degree.

6. The combination according to claim 3 wherein:
   said lights are mounted such that the angles between their beams can be adjusted between eight degrees and less than one degree.

7. The combination according to claim 1 wherein:
   said angle is fixed at four degrees.

8. The combination according to claim 2 wherein:
   said angle is fixed at four degrees.

9. The combination according to claim 3 wherein:
   said angle is fixed at four degrees.

10. The combination according to claim 1 wherein:
    the beams from both of said lights are directed parallel to a horizontal plane when said aircraft is in level flight.

11. The combination according to claim 10 wherein:
    said lights are mounted such that the angles between their beams can be adjusted between eight degrees and less than one degree.

12. The combination according to claim 10 wherein:
    said lights are mounted such that the angles between their beams can be adjusted between eight degrees and less than one degree.

13. The combination according to claim 10 wherein:
    said angle is fixed at four degrees.

14. The combination according to claim 2; further including:
    a third aiming light attached to substantially the same point on said aircraft, the beam from said third light being directed parallel to a horizontal plane through the center of the beam from said first light and the beams from said first and third lights being separated by a small angle of less than ten degrees.

15. In combination with a low flying, terrain following aircraft piloted by a humanoid equipped with electronic infrared viewing equipment, the improvement comprising:
    a plurality of groups of laser type aiming lights each emitting an extremely narrow beam of radiation, the lights in each group being attached to substantially the same point on said aircraft and having their beams directed substantially parallel to at least one of the horizontal and vertical planes through the flight path of said aircraft;
    one of said beams being directed substantially parallel to both of said planes; and
    said beams in each group being separated by a small angle of less than 10 degrees, whereby said beams diverge slightly to illuminate close but noticeably separated cue spots on said terrain at any altitude.

* * * * *